United States Patent [19]

Kim et al.

[11] Patent Number: 5,544,128

[45] Date of Patent: Aug. 6, 1996

[54] MULTI-BEAM DIGITAL BEAMFORMING METHOD AND APPARATUS

[75] Inventors: Jin Kim, Issaquah; Lin X. Yao, Bellevue; Zoran Banjanin, Renton, all of Wash.

[73] Assignee: Siemens Medical Systems, Inc., Iselin, N.J.

[21] Appl. No.: 270,868

[22] Filed: Jul. 5, 1994

[51] Int. Cl.[6] ............................. G01S 15/00; A61B 8/00
[52] U.S. Cl. ..................... 367/119; 367/103; 128/661.01
[58] Field of Search ................................. 367/103, 119; 128/661.01; 73/625, 626

[56] References Cited

U.S. PATENT DOCUMENTS

| | | | |
|---|---|---|---|
| 4,796,236 | 1/1989 | Welles, II et al. | 367/103 |
| 4,800,891 | 1/1989 | Kim | 128/661.09 |
| 5,263,483 | 11/1993 | Nishigaki et al. | 367/103 |
| 5,369,624 | 11/1994 | Fukukita et al. | 367/103 |
| 5,388,079 | 2/1995 | Kim et al. | 367/103 |

Primary Examiner—Ian J. Lobo

[57] ABSTRACT

In accordance with the principles of the present invention, advantage is taken by the inventors of the fact that the speed of operation of the digital hardware in a digital beamformer can be reduced by providing, for example, multiple phases of the data signals and then processing the multi-phase data in N parallel summing paths. An interpolation-decimation filter receives the multi-phase data from the N parallel summing paths and provides at its output a signal having a reduced data rate (1/N). In accordance with this technique, the speed of operation of the individual digital circuits for forming the required beamforming delays is not increased as compared to conventional post-beamforming interpolation schemes, so that hereby the effective data rate is increased by a factor N and results in a decrease of the delay quantization error by a factor N. In accordance with the principles of the invention, the interpolation-decimation filter is incorporated into the beamformer at a most advantageous place. That is, it is incorporated into the beamformer processing after partial beamforming of a group of receive channels and before formation of the final beam. This approach allows the final beamforming to be simple and performed at a relatively low data rate and allows the higher rate signal processing to be confined to circuitry which may advantageously be on a single type of integrated circuit which is repetitively used in the beamformer. Further increase in the effective speed of operation is produced by providing timing circuitry that allows parallel processing of signals from a plurality of scanning beam lines.

21 Claims, 11 Drawing Sheets

MULTI-BEAM DIGITAL BEAMFORMING METHOD AND APPARATUS

CROSS REFERENCE TO RELATED APPLICATIONS

U.S. Pat. No. 5,369,624, entitled DIGITAL BEAMFORMER HAVING MULTI-PHASE PARALLEL PROCESSING, and U.S. Pat. No. 5,388,079, entitled PARTIAL BEAMFORMING, both of which are assigned to the same assignees as the instant application, have related subject matter.

BACKGROUND OF THE INVENTION

1. Field of the Invention

This invention relates to a time-domain receive beamformer using digital signal processing techniques, i.e., analog to digital converters, digital memories, adders, multipliers, filters, etc., and more particularly, to a method and apparatus for digital receive beamforming in a medical ultrasound diagnostic system.

2. Background of the Invention

The objective of beamforming in a system is to form a narrow beam for improving reception of a signal arriving from a desired location, in the presence of noise and interfering signals from other locations. Beamforming can be performed during energy transmission or reception. This invention relates to the formation of beams during reception.

Beamforming is useful in a number of applications, i.e., radar, sonar, communications, geophysics, astrophysics, etc. The present invention concerns beamforming in ultrasound imaging. Using medical ultrasound imaging apparatus, anatomical structures within a body of a patient can be displayed and analyzed. The apparatus transmits sound waves of very high frequency (typically b MHz to 10 MHz) into the patient and then processes the echoes reflected from structures in the body being examined. The purpose of the apparatus is to display and/or analyze the return echoes. There are many types of displays used by medical ultrasound diagnostic apparatus, but probably the one most generally useful is a two-dimensional image of a selected cross-section of the anatomical structure being examined. This important mode of operation is called the echo or B mode. Using this mode of operation, a number of anatomical defects in a patient can be detected. Furthermore, the size of these defects can be more or less precisely determined. In this mode of operation all echoes from a selected cross-section are processed and displayed. The most critical operational parameter with respect to performance in this mode of operation is the size of the resolution cell. The size of the resolution cell can be decreased (thereby increasing resolution) by implementation of dynamic focusing and dynamic (matched) filtering. These techniques are easier to implement with a digital beamformer than with an analog beamformer.

In some clinical applications, anatomical defects can be relatively small and overshadowed by echoes reflected from larger anatomical structures. However, a small anatomical defect in or near a blood vessel may manifest itself by causing a relatively large change in the velocity of blood flowing in the vessel. It is known that a Doppler shift echo processing technique can be used for determining the velocity of a moving object. The display of Doppler shift for blood flow allows relatively small anatomical abnormalities to be more easily detected. This mode of operation, now commonly referred to as Color Flow, such as described in U.S. Pat. No. 4,800,891 issued to Kim, allows Doppler information about blood velocity to be gathered from large selected cross-sections of the anatomical structure. It is difficult, however, to acquire sufficient ultrasound data to develop an accurate high resolution blood flow image at a sufficiently high frame rate. In order to get more precise Doppler information about blood flow velocity from a small cross-section area, a Doppler processing technique such as known, for example, from an article by Halberg and Thiele published in the Hewlett-Packard Journal, pp. 35–40, June 1986, may be used. Using this technique it is possible to devote more time to a selected small area. The Doppler data is usually processed by FFT techniques and displayed by means of a spectrum. The Doppler data is also presented as an audio signal.

The quality of the beamforming has its greatest influence on the accuracy, resolution and other parameters of the forenoted modes of operation of the ultrasound imaging apparatus. A conventional beamformer electronically provides time delays to match the signal propagation delays of the ultrasound pressure field which is incident upon the ultrasound beamformer from a specific direction. This time-delay (or spatial processing) enhances the amplitude of the coherent wavefront relative to the background noise and directional interference. In an analog beamformer, this is done using analog delay lines and summing networks. These analog components restrict modern ultrasound diagnostic equipment in many different ways and are therefore undesirable. They are relatively expensive, unstable, and influenced by environmental conditions and age. Analog components also require careful manufacturing and assembly. The use of analog delay lines also limits the desired flexibility of modern ultrasound apparatus. Many compromises have to be made in an analog beamformer in order to support the previously mentioned major modes of operation. Furthermore, parallel processing, which is necessary for increasing the frame rates of real time ultrasound equipment, is very costly if the beamformer is implemented using analog processing techniques.

The increase of performance and reliability and decrease of cost of digital components makes digital beamforming a more promising alternative as compared to classical analog beamforming. Precision, stability and flexibility are the main advantages of digital signal processing techniques. The current standard digital circuitry can work at Nyquist rates exceeding 30 MHz. These sampling frequencies are high enough for RF sampling and temporal processing of modern ultrasound signals. However, the sampling rate required to properly match the propagation delays in a digital beamformer is several times greater than the Nyquist rate for accurate signal reconstructions, i.e., it is more than 100 MHz. These processing speeds, coupled with the required precision, are still above the performance levels of presently available analog-to-digital converters (ADCs). The remaining digital functions (e.g. other than the ADC's) can be performed at these speeds by parallel processing using standard digital components.

A method proposed by Pridham and Mucci, in an article published in Proceedings of the IEEE, Vol. 67, No. 6, pp. 904–919, June 1979, eases the high speed sampling requirement for ADCs in digital beamforming by the use of digital interpolation. The received echoes need only be sampled at an interval which satisfies or exceeds the Nyquist frequency, $f_o$. The price for this reduction in ADC sampling rate is a corresponding increase in the digital processing requirements. The fine delay increments necessary for beamforming are developed using digital interpolation. In digital interpolation, the data is first padded with zeros (e.g., zeros interspersed with the data), which effectively increases the data rate. At a later point in the processing, digital filters are used to reduce the data rate to its original value. Pridham and Mucci proposed two alternative approaches. In the first, a pre-beamforming interpolation approach, the zero padding circuitry and interpolation filters for each receive channel are placed after the ADC, but before the beamforming circuitry. In the second, a post-beamforming interpolation approach, the interpolation filter is placed after the beamforming. Filtering after beamforming is possible because beamforming is a linear operation. In the first approach, signal processing requirements are not optimal, since an interpolation filter is required for each received channel. In the second approach, the digital processing required for the interpolation filtering is reduced as compared with the required processing of the first approach since filtering is done only once rather than for each channel. The digital processing requirements can be further reduced by incorporating the interpolation filter into the digital filters of the receiver circuits which follow the digital beamformer. However, the beamforming signal processing is still not optimal because the beamformer processing rates (i.e., those needed to generate the required time delays) are much higher than the signal Nyquist rate.

It is an object of the present invention to provide a method and apparatus for digital beamforming which minimizes the signal processing rates in order that a system can be built with digital circuitry working at the signal Nyquist rate. Incorporation of such a method or apparatus in an ultrasound diagnostic system will offer all the advantages of digital beamforming, i.e., flexibility of the various modes of operation, parallel channel beamforming, dynamic focusing, matched filtering, etc., while minimizing the signal processing data rate.

Another object of the present invention is to provide a method and apparatus for digital beamforming wherein signal processing is carried out for a plurality of scanning beam lines in parallel; i.e. a plurality of beams are formed in parallel. For a given signal processing data rate, fulfilling this objective increases the effective data rate of the beamformer.

SUMMARY OF THE INVENTION

In accordance with the principles of the present invention, advantage is taken by the inventors of the fact that the speed of operation of the digital hardware in a digital beamformer can be reduced by providing multiple phases of the signal data and then processing the multi-phase data in N parallel summing paths. In accordance with this technique, the speed of operation of the individual digital circuits for forming the required beamforming delays is not increased as compared to conventional post-beamforming interpolation schemes, so that hereby the effective data rate is increased by a factor N and results in a decrease of the delay quantization error by a factor N. Additionally, an interpolation-decimation filter is incorporated into the beamformer at a most advantageous place. That is, it is incorporated into the beamformer processing after partial beamforming of a group of receive channels and before formation of the final beam. This approach allows the final beamforming to be simple and performed at a relatively low data rate. Furthermore, with appropriate selection of the grouped received channels, the multi-phase data processing and subsequent interpolation can advantageously be confined to a single integrated circuit or circuit board.

Additionally, the beamformer is provided with controlled read circuits in each receiving channel, allowing a given block of signal data in a given channel to be read more than once at various different times and processed with signal data in other receiving channels. This allows the beamformer to simultaneously process signal data from several scanning beam lines at once in a parallel fashion, which further increases the effective data rate.

These and other features and advantages of the invention will be apparent from the following description of the preferred embodiments and from the claims.

For a fuller understanding of the present invention, reference should now be made to the following detailed description of the preferred embodiments of the invention and the accompanying drawings.

DETAILED DESCRIPTION OF THE PREFERRED EMBODIMENTS

Modern medical ultrasound systems use probes having multiple transducer elements, and therefore have beamformers with multiple signal processing channels. The number of channels can be 64, 128, and even as high as 256. It is generally not practical to implement all of the beamformer signal processing channels on a single circuit board. Therefore, the receive beamformer is usually divided into several groups. Each group is a partial beamformer containing a number of receiving channels (e.g., eight or sixteen channels). The echo signal from a target is received by the transducer elements of a probe. Each element is connected to a different receiving channel. In each receiving channel the signal from a transducer element is amplified and then digitized at a uniform rate, $f_o$.

Figure 1:
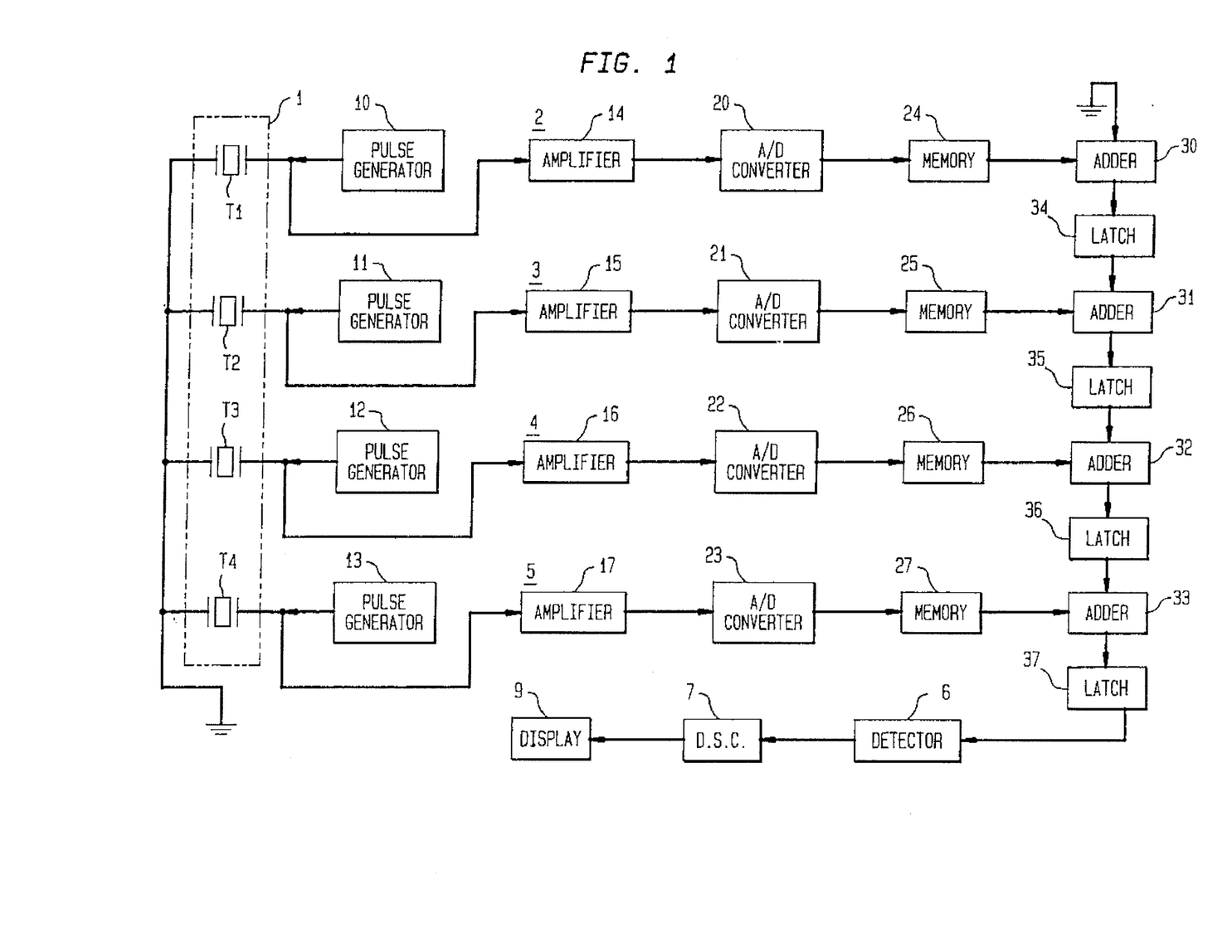
FIG. 1 illustrates in functional block diagram form, an ultrasound imaging apparatus in accordance with the prior art having a digital beamformer and serial summation of data samples from each receive channel.

An electronic scanning ultrasound diagnostic apparatus having a beamformer including a serial data summing path is shown in FIG. 1. An ultrasound probe 1 consists of an array of transducer elements T1 through TM. In order to simplify the description, it is assumed that M=4 although as noted above, it can be much greater. Four pulse generators 10 through 13 generate conventional driving pulses by means of trigger signals, as well known, to cause elements T1 through T4 to transmit ultrasound signals into the tissue of a body under test. Ultrasound echo signals which are reflected from within the tissue under test will be received by the same transducer elements T1 through T4. The signal developed from each element in response to the echoes is amplified by a respective one of amplifiers 14 through 17 and then digitized by a respective one of ADC's 20 through 23 at a uniform rate, $f_o$, in parallel receiving channels 2 through 5. The received digital data from the parallel receiving channels is stored in memories 24 through 27, respectively. The data read-out from memories 24 through 27 is serially added to the data from the preceding parallel receiving channel by a serial summation path including adders 30 through 33. The sums at the adder outputs are temporally stored by latches 34 through 37 before sending them to the next channel. In order to take into account and compensate for the signal processing time delays caused by the serial summation of the data by adders 30–33, time delays are developed by delaying the read-out or write-in of memories 24 through 27. The serial summation simplifies the signal processing data paths. The formed beam signal developed at the output of the last adder 33 is detected by a detector 6. In order to show the data on a display 9, it is necessary to convert the digital data signal into a video signal using a digital scan converter (DSC) 7, as well known.

Figure 2:
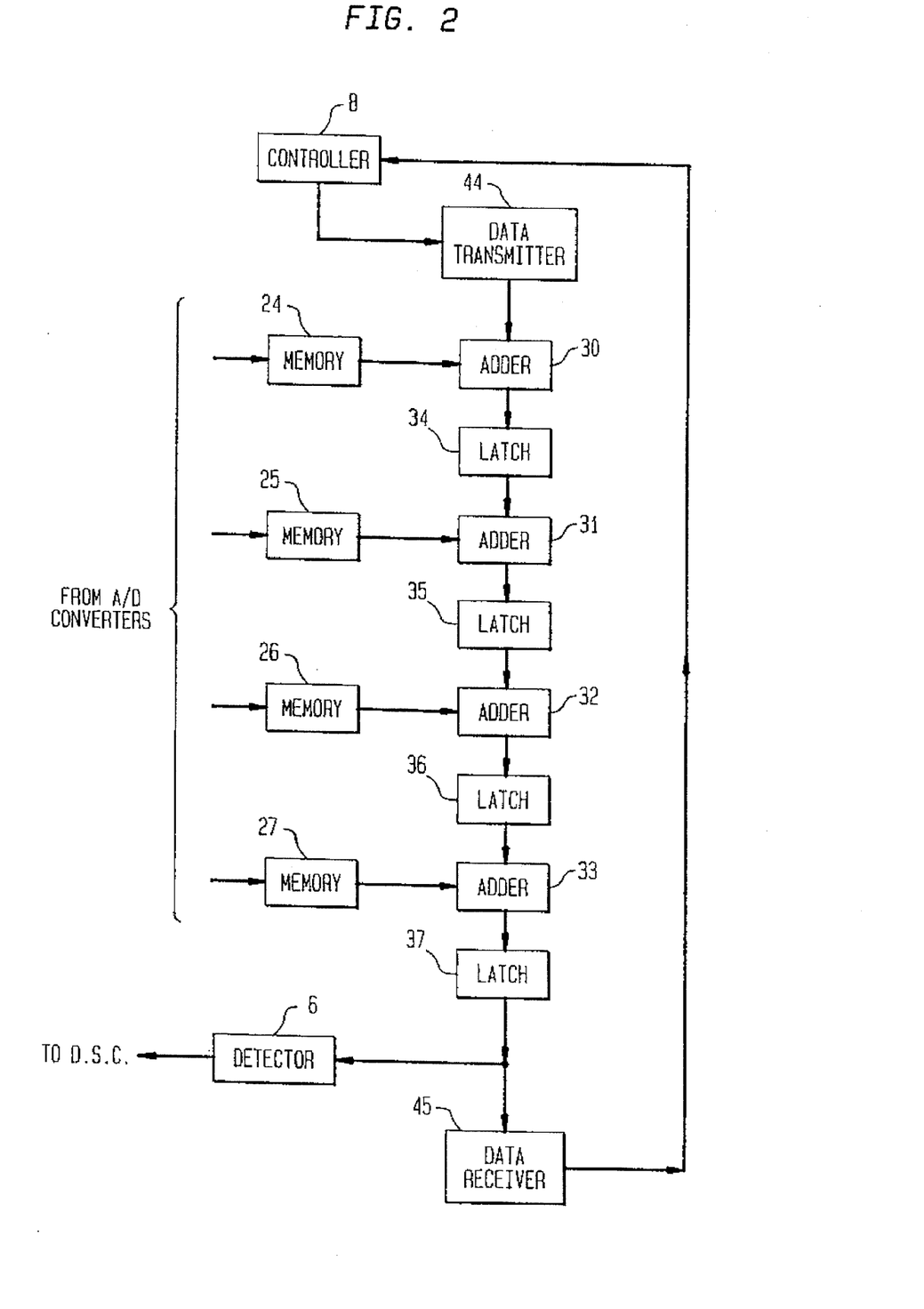
FIG. 2 illustrates in functional block diagram form the serial summation of data samples in the digital beamformer of FIG. 1, modified to include built-in testing circuitry.

As shown in FIG. 2, a built-in testing means is provided for each group of parallel receiving channels. A data transmitter 44 is connected at the beginning of the data summing path, and a data receiver 45 is connected at the end of the data summing path. Controller 8 sets a predetermined pattern of digital testing data for data transmitter 44 which is then processed by the data summing path and received by the data receiver 45. Controller 8 then analyzes the received data to see if it coincides with the expected data after the data summing. In the beamforming mode, zero's are generated by the data transmitter 44 in order that the serial summing of data from memories 24–27 is not disturbed.

To achieve a smaller quantization error for the dynamic focusing delay, in accordance with one aspect of the invention, a new beamformer interpolation arrangement is provided. In conventional beamformer interpolation, as previously stated, if the data rate is increased by a factor of N, then the processing speed of the adders and the clock frequency would increase by the same factor. To avoid the use of higher-frequency clocks and high speed adders, the new beamformer interpolation arrangement uses a multi-phase memory read-out scheme which 1) reduces the quantization error, and 2) allows the use of the same clock frequency, $f_o$, throughout the beamformer processing. With this arrangement, groups of the receive channels can be combined using a single interpolation-decimation filter, thereby forming a partial beam using each group of received channels.

Figure 3:
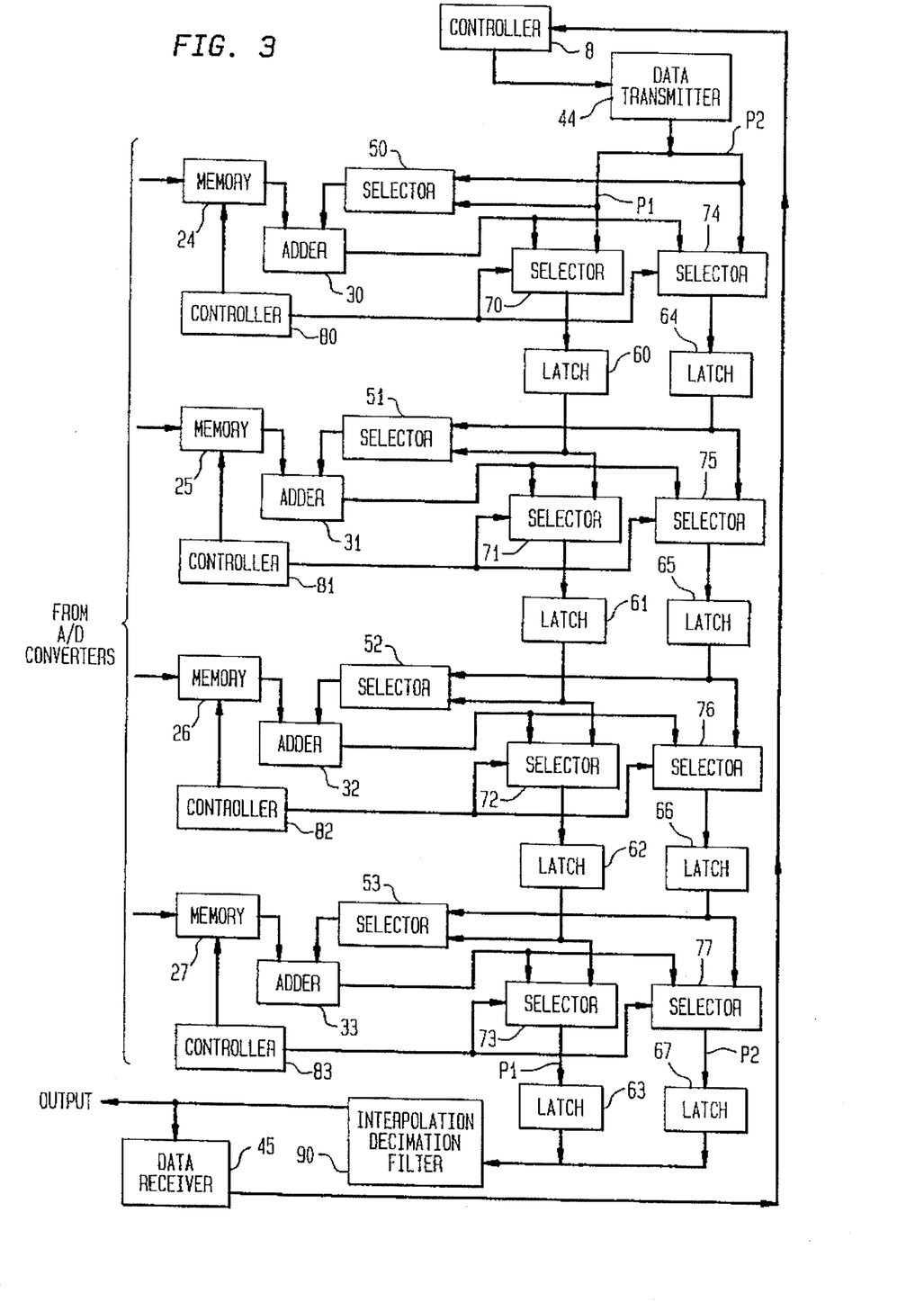
FIG. 3 illustrates in functional block diagram form, a novel multi-phase parallel processing scheme for a digital beamformer which, when compared with the embodiment of FIG. 1, illustrates novel apparatus for doubling the precision of the beamforming.

The new beamformer having a multi-phase memory read-out arrangement is illustrated in FIG. 3. The write-in data to memories 24 through 27 are clocked at the same rate as the sampling rate, i.e., $f_o$. The read-out clock is also $f_o$, but it is not uniform. Read-out is stopped at some clocks when an additional delay time is needed. This will give a delay time adjustment of $1/f_o$, referred to herein as a rough delay unit. To further reduce the quantization error of the delay time, the read-out data is sorted into N-parallel summing paths P1 and P2 (N=2 in FIG. 3), to fine tune the delay time to $(n-1)/N$ of the rough delay unit, n=1, ..., N. Each parallel summing path represents a different phase of the read-out data. Therefore, by shifting the read-out data to the next phase, the delay adjustment will be $1/(Nf_o)$, referred to herein as a fine delay unit. By using the multi-phase read-out, the dynamic receiving focusing can be adjusted with fine delay units. Each data sample from a given channel is directed to only one of phases P1 and P2. However, before directing the data into the chosen parallel summing path, it is necessary to add it to the data sample from an adjacent channel. Selectors 70 through 77, 50 through 53, adders 30 through 33 and latches 60 through 67 execute directing and serial summation for the data samples provided to the parallel summing paths. For example, if data from memory 25 should be directed into phase P1, data from latch 60 out of phase P1 is brought through selector 51 to adder 31. At the same time selector 75 brings data from phase P2 out from latch 64 to latch 65. Next, selector 71 selects data from adder 31 and directs that data to latch 61. Controllers 80–83 decide into which of N phases the data from memories 25 through 27 should be directed and controls the selectors and latches associated therewith accordingly. An interpolation-decimation filter 90 combines the multi-phase data, and then outputs the combined data at the system clock rate, $f_o$, to the remainder of the ultrasound system.

Figure 4:
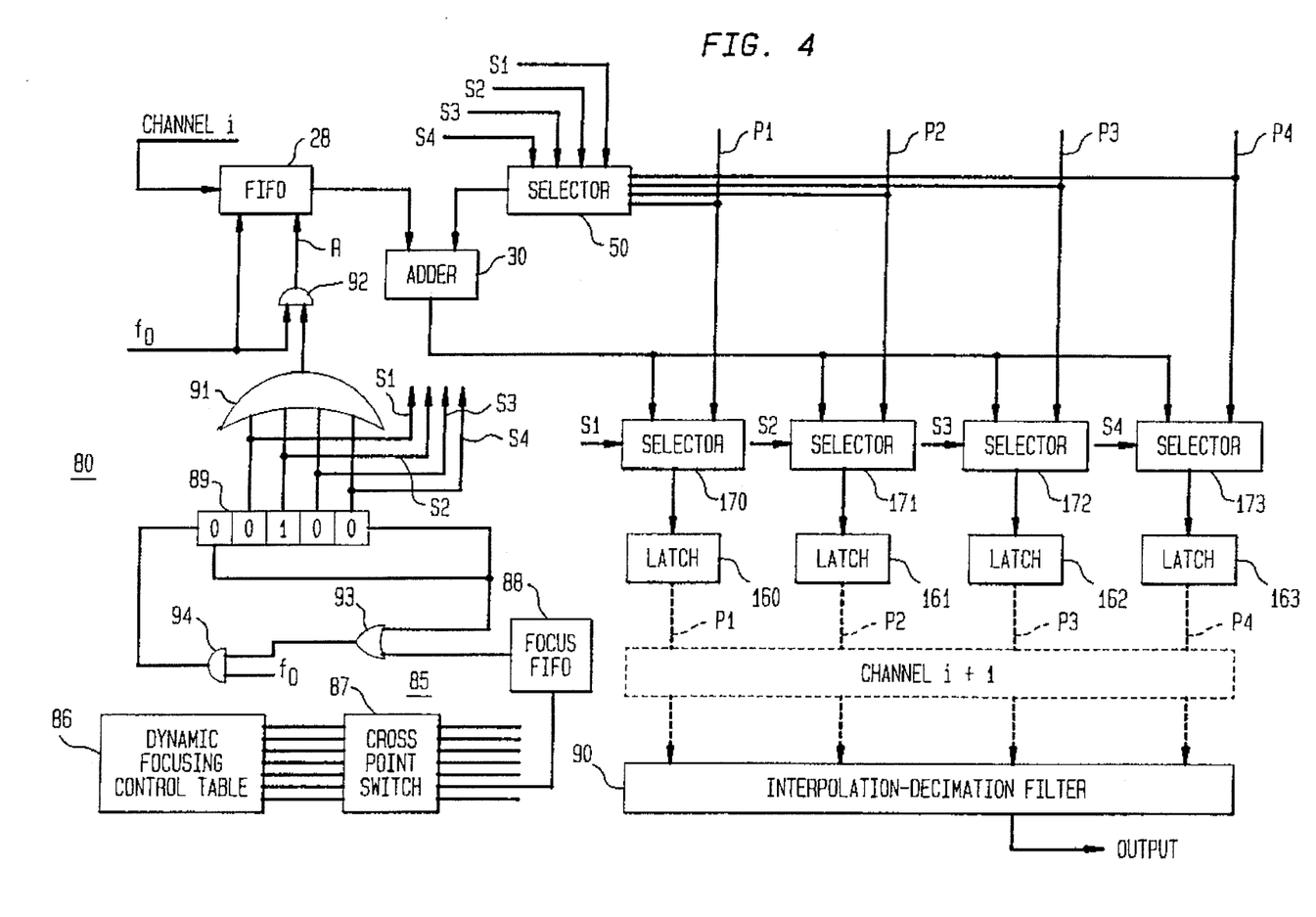
FIG. 4 illustrates in block diagram form details of a novel dynamic delay-time controller for a digital beamformer constructed as illustrated in FIG. 3, but having four-phase data and four parallel summing paths.

FIG. 4 is a preferred embodiment of a beamformer having four-phase data (P1 to P4) and thus four parallel summing paths for the echo data, and a dynamic delay-time controller 80. The dynamic delay time controller 80 outputs the phase information needed for each channel at each clock via memory read-out control signal R and selector control signals S1–S4. For example, if at a given time the memory read-out phase for a given channel is supposed to be at phase P2, the data on the P2 summing path from the preceding channels will pass through selector 50 and be added to the new data from channel i (when it is read out from FIFO memory 28) via adder 30. The sum from adder 30 will then go through selector 171 to the next parallel receiving channel (i+1). The remaining parallel summing paths (P1, P3 and P4) are directly connected via selectors 170, 172 and 173, latches 160, 162 and 163, which is equivalent to padding zero's to the ith channel echo data in these other phases. Thus, delay-time controller 80 controls the phase for each data sample read-out of each channel memory. A delay data memory 85, which may comprise a look-up table 86 for storing focusing delay data for all channels in the beamformer, a cross-point switch 87, and a shift register 88 (one shift register for each channel), outputs a 1-bit data stream for each channel. A '1' from the delay data memory 85, which is called a phase shift pulse, indicates that an additional fine delay time unit needed, and will cause an phase shift. A 5-bit shift-register 89 (one register for each parallel receiving channel), generates the phase information selector control signals S1–S4 and a memory read-out inhibit signal R is generated via an OR gate 91 and an $f_o$ clocked AND gate 92. Only one bit at a time in 5-bit register 89 is set to a '1' thereby indicating which of the four phases the data from the ith channel is to be directed. Whenever the shift register accepts such a phase shift pulse, the '1' shifts right-ward, thereby changing the selected phase from phase P1 to phase P2, or phase P2 to phase P3, or phase P3 to phase P4. An OR gate 93 and AND gate 94 are also coupled as shown between the output P4 of the shift register and its shift input. Thus, if there is no phase shift pulse from the delay data memory 85, the selector control signals (S1–S4) will remain unchanged. State 0 in the shift-register is a temporary state. When phase P4 is selected, the '1' increment shifts shift register from state 4 to state 0, temporarily. The next clock will change the state of the input to shift register 89 from state 0 to state 1. Shift register 89 will stay in state 1 until the next phase shift pulse '1' comes. During the clock period when the state is 0, data is not read-out from memory 28, and therefore the length of the delay for the data from memory 28 will be increased by 1. Thus, by this mechanism, the four fine delay units are turned into a rough delay unit.

The thus summed data in the four parallel summing paths in FIG. 4 are provided in a parallel manner to the input of interpolation-decimation filter 90. Filter 90 performs alignment, interpolation and decimation of the input data. Due to the multi-phase nature of the parallel input, the effective input data rate of filter 90 is four times greater than the data rate of the output or any of the input data from the parallel summing paths.

Figure 5:
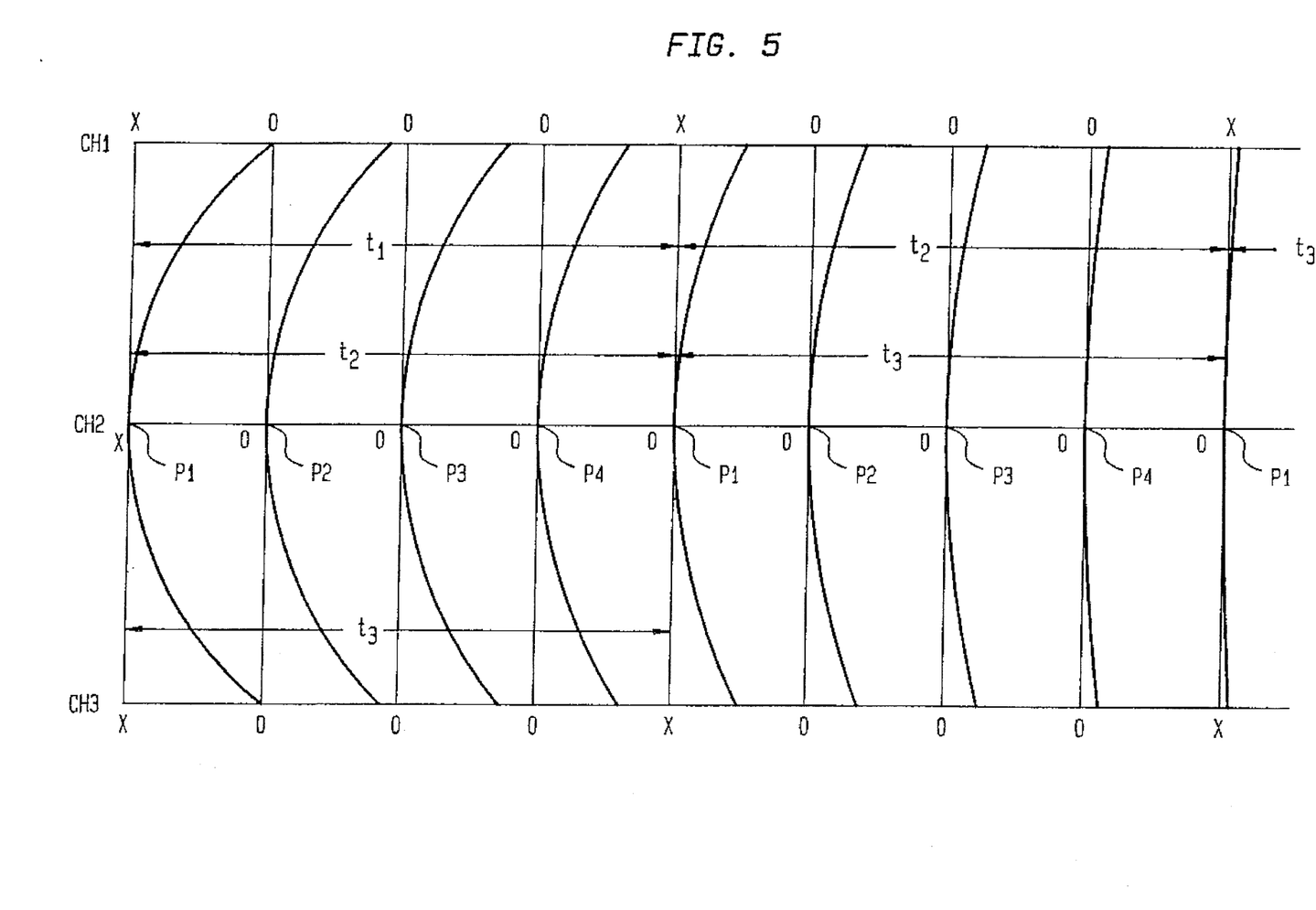
FIG. 5 graphically illustrates the assignment of successive N data samples for three adjacent receiving channels to various ones of the four phases shown in FIG. 4 for accomplishing beamforming.

FIG. 5 graphically illustrates, for purposes of example only, the assignment of three successive data samples for three adjacent receiving channels (1–3) to various ones of the four phases P1–P4 shown in FIG. 4, for three successive time intervals $t_1$, $t_2$ and $t_3$. In FIG. 5, actual data samples are denoted by an X (occurring at the $1/f_o$ rate), zero value samples for accomplishing zero padding are denoted by a 0 (occurring equally interspersed with the actual data samples at the $1/4f_o$ rate), and the horizontal direction is representative of time. For the three illustrated parallel receiving channels, the time delays required during each time period for achieving dynamic focusing of the beamformer is illustrated by the vertically oriented curved lines, as well known. It is obvious from this timing diagram that during the $t_1$ time interval for channel 1, only one actual sample (the second sample in channel 1) is closest to a time delay curve, the one just after the P4 phase, and therefore the P4 summing path is the most appropriate to receive this sample. For all other phases (P1 through P3) zeros are added to the data path (by the selector and latching circuitry of FIG. 4). During the time period between time intervals $t_1$ and $t_2$, the data from all four parallel summing paths are passed from channel 1 to channel 2 (by the selector and latching circuitry of FIG. 4). During time interval $t_2$ an actual data sample is read-out from the memory for receiving channel 2 and directed into the parallel summing path representing phase P1, since that actual sample is closest to the required time delay curve. At the same time ($t_2$), for channel 1, there is no actual sample which is closest to any of the time delay curves. Note, the actual sample (the third sample) is in fact closer to phase P1 for the $t_3$ time period. Thus, all four phases during the $t_2$ time period for channel 1 are zero padded. This "no data providing" corresponds to the above-noted state "0" of shift register 89. Next, between times $t_2$ and $t_3$, sample data are passed from receiving channel 2 to receiving channel 3 and from receiving channel 1 to receiving channel 2. During time $t_3$, the third sample read-out from the memory of channel 1 is placed into the parallel summing path representing phase P1 (as previously noted), the second sample read-out from the memory of channel 2 is placed into the parallel summing path representing phase P1, and the second sample read-out from the memory of channel 3 is placed into the parallel summing path representing phase P4.

Figure 6:
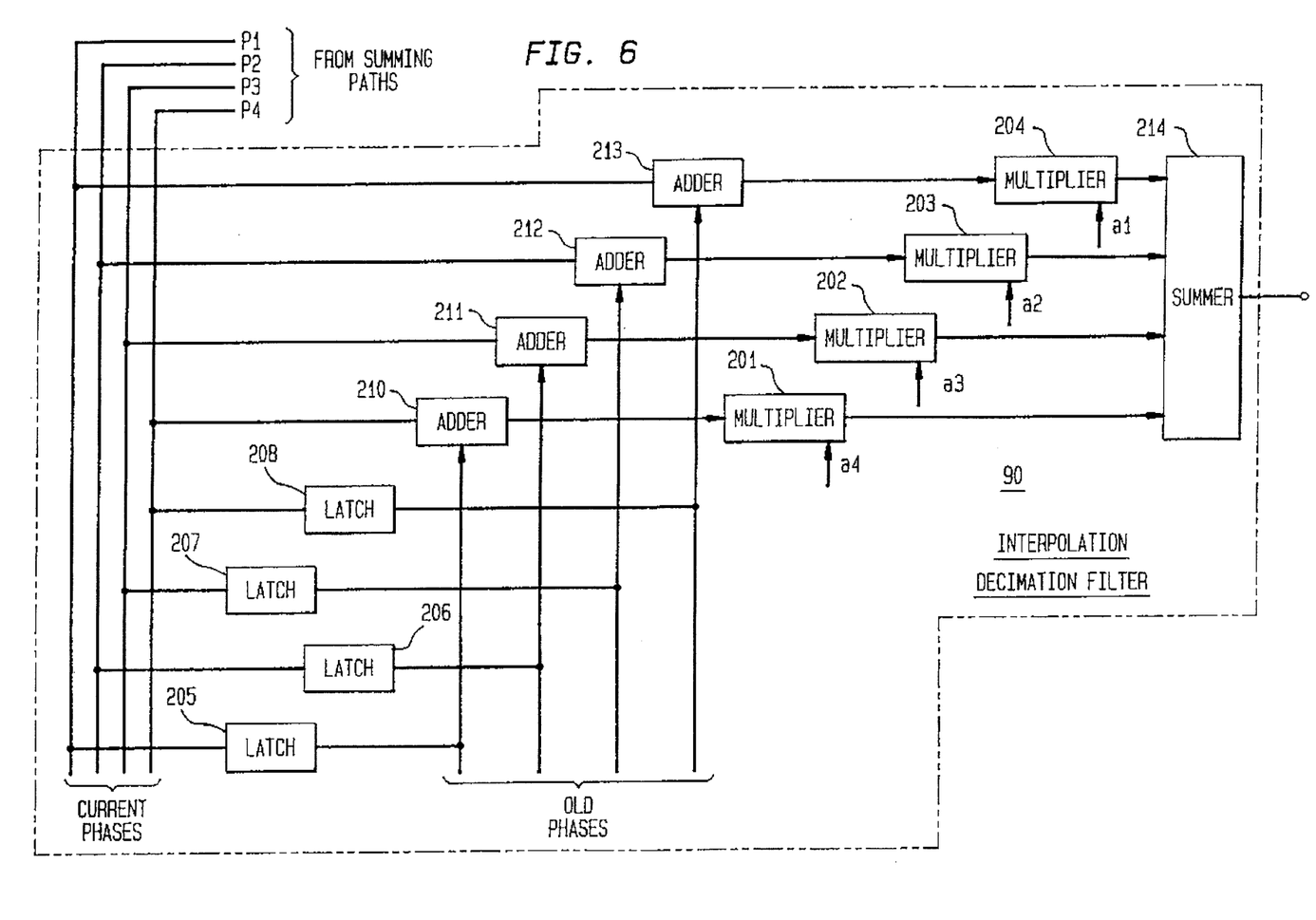
FIG. 6 illustrates in block diagram form details of an FIR filter constructed in accordance with the principles of the invention and used for the alignment, interpolation and decimation of data samples for the digital beamformer shown in FIG. 4.

In the preferred embodiment of the invention, it is convenient to use a Finite Impulse Response (FIR) filter for interpolation-decimation filter 90 because of its short transient response time and inherent linear phase. The FIR filter shown in FIG. 6 comprises (for a four-phase system) an 8-tap low pass filter and advantageously uses symmetric impulse response weighting coefficients (a1, a2, a3, a4; a4, a3, a2, a1) to save on the number of multipliers 201, 202, 203, and 204 required. The "current" phase data from the summing paths representing phases P1, P2, P3 and P4 are stored in latches 205, 206, 207, and 208, respectively, for forming "old" phase data. Then, the "old" phase data are appropriately added to the "current" data arriving on summing paths representing phases P4, P3, P2, and P1 via adders 213, 212, 211, and 210 and a final beamformer output sample is produced by combining the output of multipliers 201, 202, 203 and 204 in a summer 214.

It has been proposed by Pridham and Mucci, as noted above, that the interpolation and decimation filter can be placed before or after beamforming. Prebeamforming implementation of this filter requires that every channel has its own interpolation-decimation filter. While post-beamforming implementation solves that problem, it requires that beamforming has to be done at very high sample frequencies. In accordance with the principles of the invention, this filter is implemented during, rather than before or after, beamforming. This approach places the filter where it is the most cost effective for the architecture of the beamformer as a whole. The filtering and data rate reduction is performed after a partial beamforming of a group of several of the parallel receiving channels. For example, the parallel receiving channels can be combined into groups of two, four, eight or more. The filter can then be physically placed on the same board or integrated circuit (IC) used for the partial beamforming of the grouped channels. This technique reduces the number of interconnections and/or the data rate which are required between the grouped channels, circuit boards and IC's. Then, the final adding of the grouped channels (i.e., the partially formed beams) can be done at the system sampling rate and using only one data path.

Figure 7:
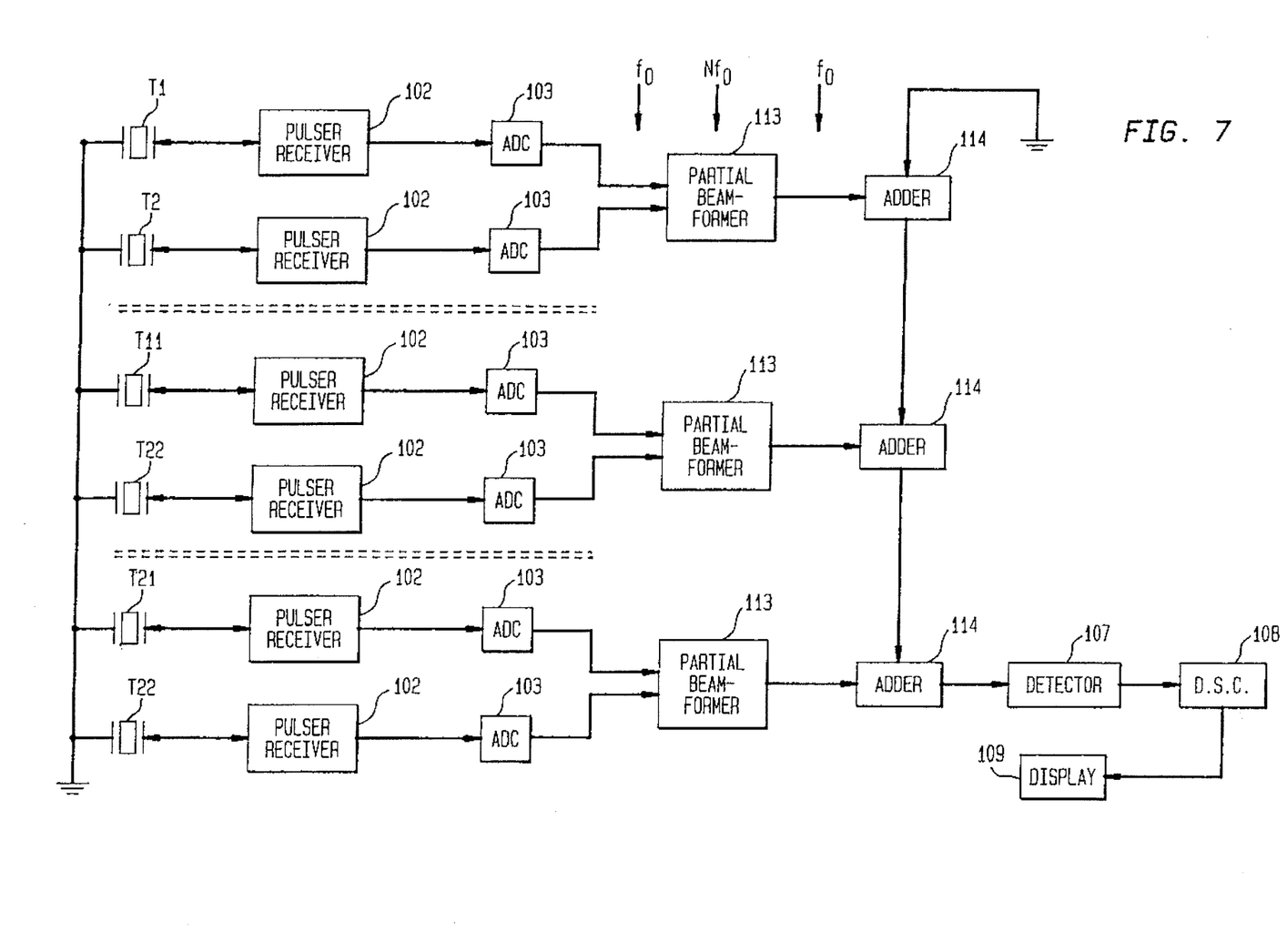
FIG. 7 illustrates, in block diagram form, a digital beamformer constructed in accordance with a further aspect of the invention consisting of partial beamformers and serial summation of the signal samples from each partial beamformer.

FIG. 7 is the overall diagram of the receive beamformer which more clearly illustrates the partial beamforming aspect of the invention. In each channel, the echo signal from a target is received by the transducer elements of a probe. Each transducer element is connected to a pulse receiver 102 of conventional design. The signal developed by each transducer element is digitized with an ADC 103 at a uniform rate $f_o$, e.g. 36 MHz. Groups of adjacent parallel receive channels (e.g., 8) are combined so as to form a partial beamformer 113. In contrast with conventional prior art methods, the present invention provides an interpolation-decimation filter for each partial beamformer 113. Although it is possible to use only one interpolation-decimation filter for the whole beamformer system, the illustrated scheme has one interpolation-decimation filter per each group of receive channels, which reduces the data rate after partial beamforming to the sampling rate, $f_o$. That is, the signal processing rate of $f_o$ is used both before and after beamforming, but within the beamformer, the effective rate is, as shown in FIG. 4, four times $f_o$. From a hardware point of view this is an extremely advantageous implementation, since the high effective signal rates are confined to a single circuit board or even a single integrated circuit, thereby reducing system interconnects and complexity. The signals from the output of each partial beamformer 113 are then serially added using adders 114 (operating at $f_o$) to form the final beam. In order to take into account data delays due to serial adders 114, the delay values established at the outputs of memories 24–27 have an additional delay added for compensation purposes. The beam signal from the last adder 114 is then sent to a detector 107. A D.S.C. 108 performs digital scan conversion of this signal into a video signal for reproduction by display 109.

Figure 8:
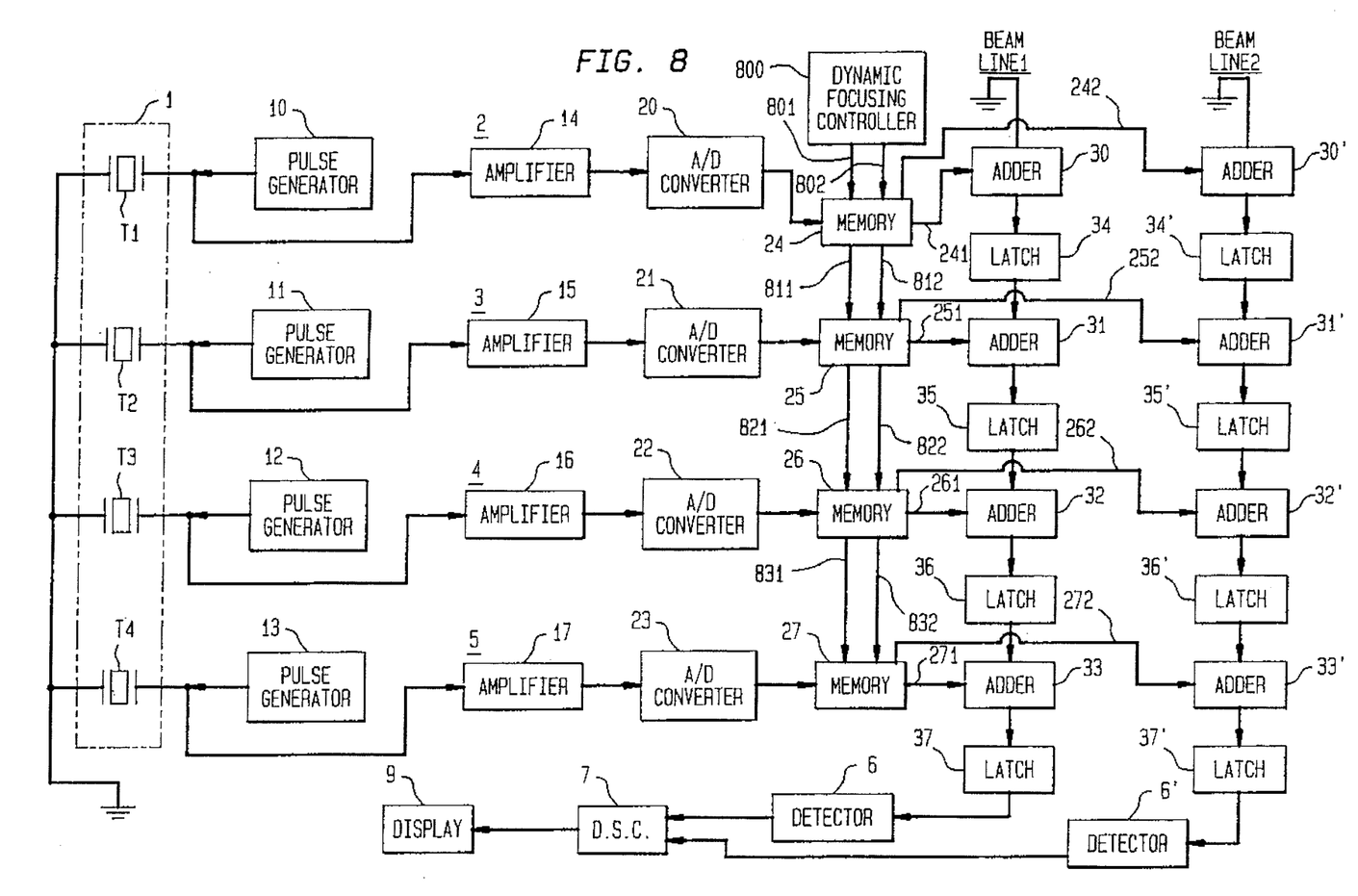
FIG. 8 illustrates in block diagram form a modification of the circuit in FIG. 1 to provide for parallel beamforming of the signal data from different receiving channels into beamformed data for different scanning beam lines.

FIG. 8 illustrates a modification of the conventional beamformer circuit of FIG. 1 to provide for parallel beamforming of data for two different beam lines, which are designated as "beam line 1" and "beam line 2" in the drawing. As in FIG. 1, the circuit shows four receiving channels which process the signals from transducers T1 through T4; these four receiving channels are labelled "2" through "5" respectively. The data signals in channel 2 are amplified through the amplifier 14, and then digitized in the analog-to-digital (A/D) converter 20, before passing into the memory 24 for storage and time-delayed further processing. Similar amplifiers 15, 16, and 17, A/D converters (ADC) 21, 22, and 23, and memories 25, 26, and 27 are in the other receiving channels 3, 4, and 5, respectively.

The time delayed read-out of data from the memory 24 is controlled by the dynamic focusing controller 800 of FIG. 8, through control signal lines 801 and 802. The delayed data are provided to the adders 30 and 30' through data channels 241 and 242, respectively. More specifically, signals from the dynamic focusing controller 800 in control signal line 801 control the read-out of data to the adder 30, while signals in the control signal line 802 control the read-out of data to the adder 30'. In a similar fashion, the dynamic focusing controller 800 controls the data read-out in memory 25 through control signal lines 811, 812, the data read-out in memory 26 through control signal lines 821, 822, and the data read-out in memory 27 through control signal lines 831, 832. The data from memory 25 are provided to the adders 31 and 31' through data channels 251 and 252; the data from memory 26 are provided to the adders 32 and 32' through data channels 261 and 262; and the data from memory 27 are provided to the adders 33 and 33' through data channels 271 and 272, respectively. The four adders 30, 31, 32, and 33 combine data for the beam line 1 through latches 34, 35, 36, and 37 to the detector 6, as described previously. Similarly, the four adders 30', 31', 32', and 33' combine data for the beam line 2 through latches 34, 35, 36, and 37 to the detector 6'. Detectors 6 and 6' transmit the beamformed data to the digital scan converter (DSC) 7 for conversion into a format suitable for the display 9.

The control of the time delays for data read-out in each channel is preferably implemented by utilizing sequential storage devices with read random access for the memories 24, 25, 26 and 27. For example, the memory 24 has a sequence of locations, such that each increment of signal data occupies one location. At a given system clock pulse an increment of data is written into the memory 24 from the A/D converter 20, and stored in a sequential location. The dynamic focusing controller 800 controls the delay time for each increment of data stored in the memory 24 by controlling the read-out address. For example, if the write-in address is 20 and the read-out address is 10, there is a time delay of 10 clock cycles for data stored in memory 24 (assuming that each read and write operation is moved to the next higher address at each clock pulse).

Figure 9:
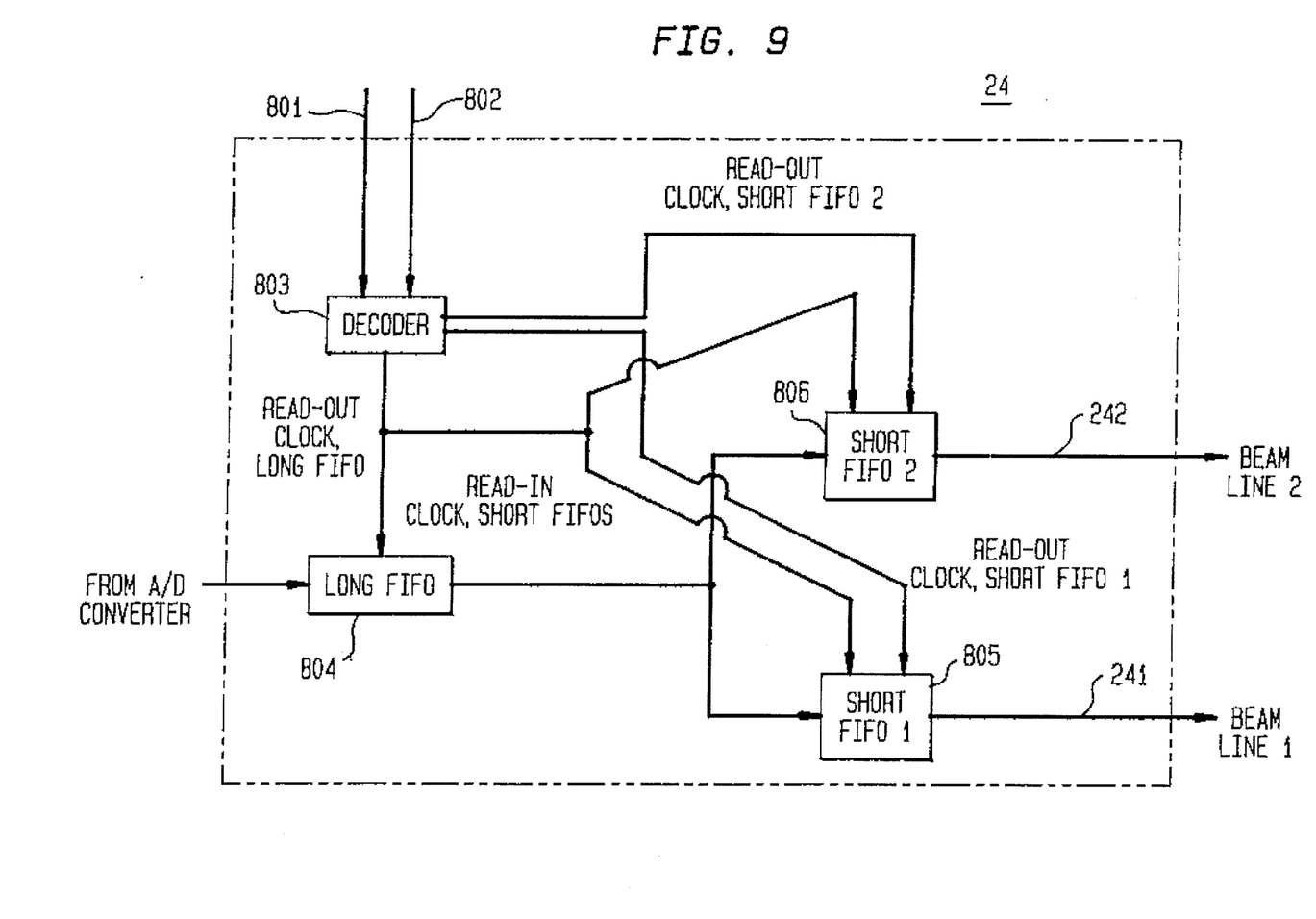
FIG. 9 illustrates in block diagram form the structure of memory 24 in one receiving channel shown in FIG. 8.

In order to form two beams at once, two delay times are required for each data increment. In a preferred embodiment of the invention this is achieved by means of the circuit illustrated in FIG. 9 for the memory 24 of FIG. 8. FIG. 9 utilizes sequential FIFO memories in which the data, rather than the read and write addresses, are shifted by one location at each clock pulse. Modern FIFO memories are typically fabricated from RAM memories with clock-driven address logic. Data for the two beams are processed by a long FIFO 804 and two short FIFO's, 805 and 806. Data from the ADC 20 of FIG. 8 are written into the long FIFO 804. Data is read out from this FIFO 804 into both short FIFO's, 805 and 806, as shown in FIG. 9. The data from short FIFO 805 is read out into data channel 241, and the data from short FIFO 806 is read out into data channel 242. The read-out data selected from the long FIFO 804 and short FIFO's 805, 806 are determined by read-out clock signals from the decoder 803, in response to the control signals from the dynamic focusing controller 800 on control signal lines 801 and 802.

This embodiment takes advantage of the fact that the two scanning beam lines are adjacent, and therefore the relative time delays between the two beams are small. In the embodiment of FIG. 9, the delay times for the data increments are divided into long delays and short delays. The long delay time is provided by the common long FIFO 804, and the short delay times are provided by the short FIFO's 805 and 806. Thus, the total delay time for data increments in beam line 1 is the sum of the delay for the long FIFO 804 and the delay for the short FIFO 805. Similarly, the delay for data increments in beam line 2 is the sum of the delays for the long FIFO 804 and the short FIFO 806. For example, suppose the data for beam line 1 should be delayed by 132 clock cycles, and the data for beam line 2 requires a delay of 135 clock cycles. The dynamic focusing controller 800 is programmed to provide a delay of 128 clock cycles for the long FIFO 804. The delay in the short FIFO 1 is then 4 clock cycles, and the delay in the short FIFO 2 is 7 clock cycles.

The dynamic focusing controller 800 similarly directs read operations from each of the other receiving channels 3–5 with the appropriate time delays in each channel to form this beam in beam line 2. In short, the signal data in memories 24–27 from receiving channels 2–5 are utilized in parallel to form beams in both beam lines 1 and 2. The data from all receiving channels are processed through the detectors 6 and 6' to form the output signal that represents the images from echoes along both scanning beam lines.

Although FIG. 8 shows this delay circuit for two scanning beam lines, it is clear from the Figure that one can process signals for additional scanning beam lines in the same way by adding further parallel circuit components, i.e. short FIFO memories, adders, filters, etc. The number of receiving channels that can be processed simultaneously is not limited by the electronic circuit itself, but rather by the angular response of the beamformer focusing structure. Since all of the scanning beam lines being simultaneously processed are a sequence of neighboring beam lines, and the relative delays between them differ only by a small amount, only a plurality of short FIFO's are required in each receiving channel. This embodiment is a significant improvement in comparison with memories having a full-size long FIFO for the data in each beam line, since the structure disclosed here requires substantially less hardware.

Figure 10:
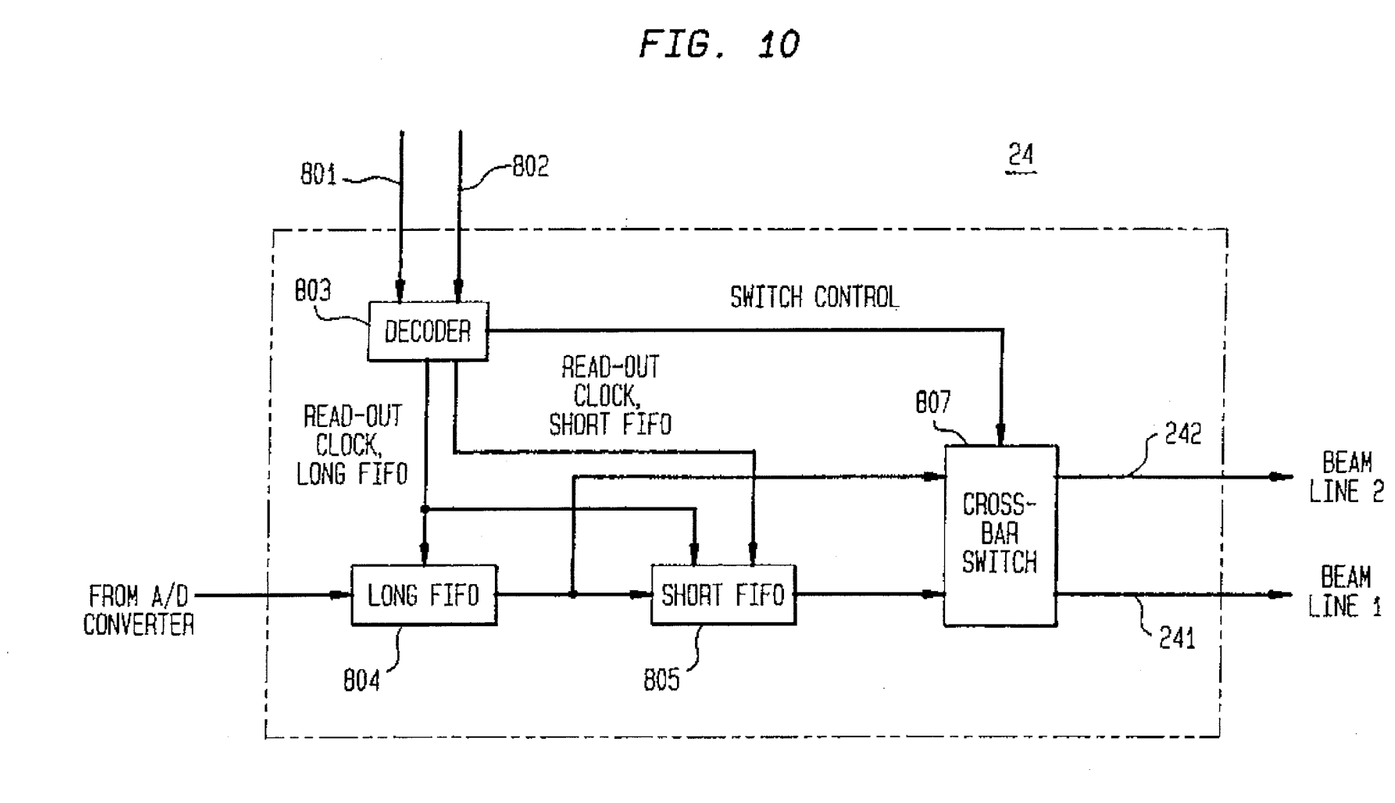
FIG. 10 illustrates in block diagram form an alternative version of the structure of memory 24 in one receiving channel illustrated in FIG. 9.

There are other data storage structures that may be utilized in place of the memory described above and illustrated in FIG. 9. For example, FIG. 10 illustrates another configuration for the memory 24 utilizing the long FIFO 804 and the short FIFO 805. Both FIFO's are controlled by read-out clock signals from the decoder 803. Delayed signals from both the long FIFO 804 and the short FIFO 805 are provided to a cross-bar switch 807, which is also controlled by signals from the decoder 803. The cross-bar switch allows delayed signals to be transmitted to either data channel 241 or 242. In this embodiment of the invention, the long FIFO determines the time delay of signals for one scanning beam line, and the short FIFO provides the delay difference between the two beam lines. The cross-bar switch enables the system to provide the shorter delayed signals from the long FIFO to either one of the beam lines, as required.

Figure 11:
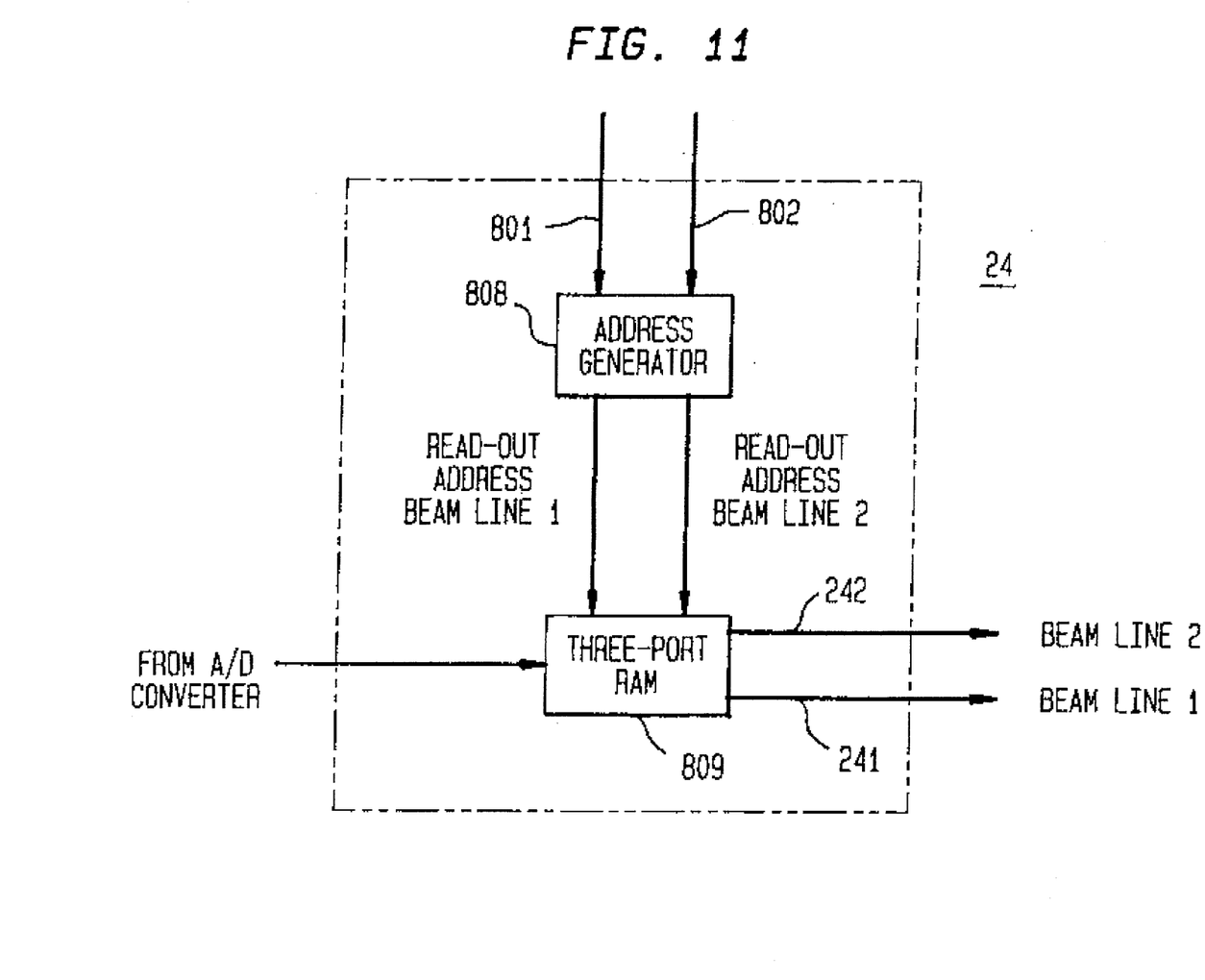
FIG. 11 illustrates in block diagram form another embodiment of the structure of memory 24 in one receiving channel illustrated in FIG. 9.

In still another version of the invention, illustrated in FIG. 11, the memory 24 is a 3-port RAM 809, with one port being the write-in port from the ADC 20, and the other ports being the read-out ports into data channels 241, 242. The dynamic focusing controller 800 sends read-out signals through the control signal lines 801 and 802 to an address generator 808, which determines the locations in the RAM 809 where data are read out for the two beam lines. Although this embodiment is illustrated for two beam lines, it may be adapted for additional beam lines by providing additional three-port RAM's connected in a cascaded manner.

In addition, FIG. 8 illustrates the adders 30–33 as a group of adders forming the beam line in beam line 1 by summing their contents through latches 34–37 in a single data summing path. A similar data summing path is drawn in FIG. 8 for beam line 2. It is preferable to utilize the multiple summing path structure disclosed previously for both beam lines to maximize the overall effective rate of data processing.

The foregoing timing system for simultaneously processing signals for different scanning beam lines achieves a further substantial increase in the effective signal processing rate. In a conventional ultrasound beamformer system, one or more acoustic pulses are transmitted into the body of a patient and the focused echo signals from a given scanning beam line are processed to generate display signal data. The entire process is repeated for the next scanning beam line, and so on, until the entire field of examination has been imaged to produce a frame. The effective frame rate is therefore limited by the transmitted pulse rate. The present system overcomes this limitation by processing a plurality of scanning beam line signals at once, namely by using the signal from each receiver channel to extract image information for echoes from different scanning beam lines that contribute to the signal.

Thus, there has been shown and described a novel beamforming method and apparatus which satisfies all the objects and advantages sought therefore. Many changes, modifications, variations and other uses and applications of the subject invention will, however, become apparent to those skilled in the art after considering this specification and its accompanying drawings, which disclose preferred embodiments thereof. For example, less or more than four data summing paths can be used, and delay-time controller 80 could be accomplished using a variety of different techniques. All such changes, modifications, variations and other uses and applications which do not depart from the spirit and scope of the invention are deemed to be covered by the invention which is limited only by the claims which follow.

What is claimed is:

1. A beamformer, comprising:

a plurality of parallel receiving channel means for detecting ultrasonic echo signals from a plurality of scanning beam lines and, in response thereto, producing a respective plurality of digital sample signals;

wherein each of said parallel receiving channels includes a memory that is communicative with said receiving channel, each of said memories receiving and storing said digital sample signals sequentially;

for each of said parallel receiving channels, a plurality of adders, each of said memories being communicative with said adders and transferring said digital sample signals to said adders in response to a control signal, each of said adders further being sequentially communicative with corresponding adders in each of the other parallel receiving channels, such that corresponding adders form a group of adders that process digital sample signals for a given scanning beam line;

a plurality of detectors, each of said detectors being communicative with and receiving data from one of said groups of corresponding adders, each of said detectors further filtering received digital sample signals of a respective one of said groups of corresponding adders for developing a beamformer signal; and control means communicative with said memories and said adders and providing said control signals, such that each of said detectors produces a beamformer signal that is focused along one of said plurality of scanning beam lines.

2. A beamformer as recited in claim 1, wherein each of said adders communicates with said corresponding adders in other receiving channels through a plurality of summing paths.

3. A beamformer as recited in claim 1, wherein each adder combines each digital sample signal with the contents of the adder and transfers the resulting data to the next adder in said sequence.

4. A beamformer as recited in claim 1, wherein each of said memories comprises a FIFO storage device with read-out means such that data from said memory are transferred to one of said adders from a selectable location in said memory that is determined by said control signal.

5. A beamformer as recited in claim 4, wherein each of said adders communicates with said corresponding adders through a plurality of summing paths.

6. A beamformer as recited in claim 4, wherein each adder combines each digital sample signal with the contents of the adder and transfers the resulting data to the next adder in the sequence.

7. A beamformer as recited in claim 4, wherein the timing of said data transfers from said FIFO storage device to said adder is governed by said control means, and such that for each plurality of digital sample signals said filter produces a plurality of beamformer signals, each beamformer signal being focused along one of said plurality of scanning beam lines, whereby said beamformer produces beamformer signals for a plurality of scanning beam lines by parallel processing.

8. A beamformer as recited in claim 7, wherein each of said adders communicates with said corresponding adders through a plurality of summing paths.

9. A beamformer as recited in claim 7, wherein each adder combines each digital sample signal with the contents of the adder and transfers the resulting data to the next adder in the sequence.

10. A beamformer as recited in claim 7, wherein said scanning beam lines form a group of neighboring scanning beam lines, and wherein each of said FIFO storage devices comprises:

a long FIFO memory for receiving said digital sample signals sequentially and providing a long timing delay for said digital sample signals; and a plurality of short FIFO memories for receiving long-delayed digital sample signals from said long FIFO memory and providing a short timing delay for said digital sample signals, each of said short FIFO memories being communicative with one of said adders and transferring said short-delayed digital sample signals to said adder;

wherein the read-out of signals from said long FIFO memory and said short FIFO memories are controlled by control signals from said control means.

11. A beamformer as recited in claim 10, wherein each of said adders communicates with said corresponding adders through a plurality of summing paths.

12. A beamformer as recited in claim 10, wherein each adder combines each digital sample signal with the contents of the adder and transfers the resulting data to the next adder in the sequence.

13. A beamformer as recited in claim 1, wherein each of said memories comprises a multiport random access memory having one write-in port and a plurality of read-out ports.

14. A beamformer as recited in claim 13, wherein each of said adders communicates with said corresponding adders through a plurality of summing paths.

15. A beamformer as recited in claim 13, wherein each adder combines each digital sample signal with the contents of the adder and transfers the resulting data to the next adder in the sequence.

16. A method for receiving digital sample signals from a plurality of receiving channels in response to detection of ultrasonic echo signals from a plurality of scanning beam lines and producing beamformer signals for said plurality of scanning beam lines simultaneously, said method comprising the steps of:

transferring the digital sample signals from each of said receiving channels to a memory with a sequence of locations, each of said memories receiving and storing said digital sample signals sequentially in said locations as stored sample signals;

reading the stored sample signals from each memory into one of a plurality of adders communicative with said memory, wherein each of said adders has an adder output signal and corresponds to and sequentially communicates with an adder in each of the other receiving channels, the corresponding adders forming a group of adders that process the stored sample signals from the respective memories for one of said scanning beam lines;

combining the stored sample signal with the adder output signals from corresponding adders in other receiving channels; and filtering the combined signals from all adders corresponding to each scanning beam line to produce a beamforming signal for each of said scanning beam lines.

17. A method as recited in claim 16, wherein the step of combining the stored sample signal with the adder output signals from corresponding adders in other receiving channels comprises the step of adding signals through a plurality of summing paths.

18. A method as recited in claim 16, wherein the step of reading the stored sample signals from each memory further comprises the step of reading said stored sample signals from locations in said memory that are controlled to effectively produce a time delay in each of said stored sample signals, such that said beamformer signal for one of said scanning beam lines is produced by each of said corresponding groups of adders by parallel processing.

19. A method as recited in claim 18, wherein the step of combining the stored sample signal with the adder output signals from corresponding adders in other receiving channels comprises the step of adding signals through a plurality of summing paths.

20. A method as recited in claim 18, wherein the step of reading the stored sample signals from locations in said memory comprises the steps of:

reading said stored sample signals from locations in a long FIFO memory that are controlled to effectively produce a long time delay in each of said signals;

writing each of said stored sample signals from said long FIFO memory into a plurality of short FIFO memories, wherein each of said short FIFO memories communicates with one of said adders; and reading into each of said corresponding adders said stored sample signals from locations in said short FIFO memory that are controlled to effectively produce a short time delay in each of said signals.

21. A method as recited in claim 20, wherein the step of combining the stored sample signal with the adder output signals from corresponding adders in other receiving channels comprises the step of adding signals through a plurality of summing paths.

* * * * *